United States Patent [19]

Ernest et al.

[11] 4,170,573

[45] Oct. 9, 1979

[54] RARE EARTH AND PLATINUM GROUP METAL CATALYST COMPOSITIONS

[75] Inventors: Michael V. Ernest, Baltimore; James M. Maselli, Columbia, both of Md.

[73] Assignee: W. R. Grace & Co., New York, N.Y.

[21] Appl. No.: 894,316

[22] Filed: Apr. 7, 1978

[51] Int. Cl.² .................... B01J 21/04; B01J 23/10; B01J 23/40
[52] U.S. Cl. ............................. 252/462; 423/213.5
[58] Field of Search ................... 252/462; 423/213.5

[56] References Cited

U.S. PATENT DOCUMENTS 3,966,391  6/1976  Hindin et al. ................. 252/462 X
3,993,572  11/1976  Hindin et al. ..................... 252/462

Primary Examiner—W. J. Shine
Attorney, Agent, or Firm—Mark T. Collins

[57] ABSTRACT

A catalyst composition comprising a composite of ceria, lanthana, and alumina and a catalytically-effective amount of one or more platinum group metals deposited on the composite is disclosed. The composite is prepared by depositing a cerium compound on a calcined admixture of the lanthana and the alumina and calcining the composite. The catalyst is capable of operating in the combustion of carbonaceous fuel at high temperatures, e.g., greater than 2400° F. (1317° C.), for extended periods of time such as 20 hours with low emissions of carbon monoxide and nitrogen oxides.

28 Claims, No Drawings

RARE EARTH AND PLATINUM GROUP METAL CATALYST COMPOSITIONS

The present invention relates to catalyst compostions containing alumina, rare earth, and platinum group metal components and having high and stable catalytic activity at extremely high temperatures and to methods for their preparation and use. The compositions provide high fuel efficiency and low emissions levels when used in the catalytic combustion of carbonaceous fuels.

A wide variety of catalysts comprise a catalytically active metal or metal oxide deposited on activated alumina. Activated alumina exhibits a high surface area per unit weight and thus allows large amounts of reactants to contact the catalyst. The high surface area of the alumina is also important when the catalyst composition contains a precious metal such as platinum because of the cost of the metal and because of the dispersion required to prevent undue metal crystallite growth. However, when used at temperatures of 1800° F. (983° C.) or higher, activated alumina undergoes a transition to alpha-alumina which results in a substantial reduction of the surface area and activity of the catalyst compositon.

A variety of metal oxides have been used to stabilize catalyst compositions containing activated alumina against the transition to alpha-alumina at high temperatures. When a catalyst is used in the combustion of carbonaceous fuel at reaction temperatures of 2400° F. (1317° C.) and higher, retention of catalytic activity for economically feasible periods is especially difficult to achieve. The catalyst decreases combustion temperatures, for example, to below 3000° F. (1650° C.) and thus decreases the emissions of nitrogen oxides. However, lower combustion temperatures result in increased carbon monoxide and hydrocarbon emissions unless the catalyst has sufficient oxidation activity to promote complete combustion.

In U.S. Pat. No. 3,966,391, Hindin et al. describe catalysts having good high temperature stability and their use in high temperature reactions, such as the combustion of carbonaceous fuel. The catalyst includes platinum group metal deposited on a calcined composite of alumina; a rare earth metal oxide; and oxide of chromium, tungsten, or mixtures thereof; and an oxide of calcium, strontium, barium, silicon, tin, or mixtures thereof. The composite is formed by the calcination of an intimate admixture of the oxide components or their precursors at a temperature of at least 500° C. (932° F.). The composite can be deposited on a relatively inert substrate and the platinum group metal then added or the catalyst composition of the platinum group metal and the composite can be deposited on the substrate. U.S. Pat. No. 3,993,572 to Hindin et al. discloses catalysts prepared by calcining a mixture of alumina and rare earth metal oxide at a temperature of at least about 750° C. (1382° F.) and then impregnating the mixture with a platinum group metal compound. In both Hindin et al. patents, compounds of cerium, lanthanum and other rare earths or commercially available mixtures of rare earths may be used in preparing the composite. Cerium is preferred as the rare earth or as the predominant component of a mixture of rare earths.

The catalyst composition of the present invention comprises a composite of ceria, lanthana, and alumina and a catalytically-effective amount of one or more platinum group metals deposited on the composite. The composite is prepared by depositing a cerium compound on a calcined admixture of the lanthana and the alumina and calcining the composite. Based upon the weight of the composite, the alumina, expressed as $Al_2O_3$, is present in an amount of from about 65 to about 98 weight percent; the lanthana, expressed as $La_2O_3$, is present in an amount of from about 1 to about 10 weight percent; and the ceria, expressed as $CeO_2$, is present in an amount of from about 1 to about 25 weight percent.

The catalyst is capable of operating in the combustion of carbonaceous fuel at high temperatures, e.g., greater than 2400° F. (1317° C.), for extended periods of time such as 20 hours with low emissions of carbon monoxide and nitrogen oxides.

The method of this invention comprises (1) forming an admixture of an aluminum compound and a lanthanum compound; (2) calcining the admixture at a temperature of at least about 1800° F. (983° C.); (3) depositing a cerium compound on the calcined admixture to form a composite; (4) calcining the composite at a temperature of at least about 1800° F. (983° C.); (5) depositing one or more platinum group metal compounds on the calcined composite; and (6) calcining the resulting composition at a temperature from about 500° to about 1400° F. (260°–761° C.). The sequence of separate deposition and intermediate calcination employed with each metal compound in forming the composite provides effective stabilization of the alumina by the lanthana and of the platinum group metal by the ceria.

In accordance with a preferred embodiment of the method of this invention, solutions of a lanthanum compound and a cerium compound are separately impregnated on alumina to form a composite. The impregnation of each solution is followed by drying and calcination to deposit the metal oxide and the calcined composite is impregnated with a solution of one or more platinum group metal compounds.

Alumina forms the major portion of the composite employed in the present invention. Alumina or aluminum compounds that are thermally decomposed to alumina by the calcination performed in preparing the admixture of the lanthana and alumina may be used as the starting material in the preparation of the catalyst composition. Activated or transitional aluminas, such as chi, rho, kappa, gamma, delta, eta, and theta aluminas, are preferred starting materials. Transitional aluminas are commercially available and are produced, for example, by heating alumina precursors such as aluminum halides, aluminum nitrate, alpha- or beta-alumina trihydrates, or alpha-alumina monohydrate. Generally, transitional aluminas are formed by a calcination of the precursor at a temperature of at least about 850° F. (455° C.) for at least about 1 hour, preferably at a temperature from about 1000° to about 1400° F. (538°–761° C.) for about 1 to about 4 hours. The activated alumina generally has a surface area of at least about 100 square meters per gram, preferably at least about 150 square meters per gram, and a total pore volume of at least about 0.4 cubic centimeters per gram, preferably from about 0.45 to about 1.5 cubic centimeters per gram. The surface areas referred to throughout the specification are those determined by the nitrogen BET method or equivalent methods. The pore volumes are determined by adding water to a powder sample to the point where incipient wetness just occurs.

Optionally, the activated alumina can be chemically treated to enhance the stability of the final catalyst composition. Such treatment can include leaching the alumina by contacting it with an acid such as nitric acid, acetic acid, or hydrochloric acid for a sufficient time to increase its surface area and to remove adsorbed basic impurities such as sodium ions which reduce high temperature stability. The length of time required for leaching will be influenced by numerous factors including the pore volume of the alumina being leached, the concentration of acid in the leaching solution, the temperature at which leaching is carried out, and the extent to which improved stability and catalyst performance is desired. Generally in order to avoid loss of alumina by conversion to water-soluble salts and to provide enhanced stability, the alumina may be contacted at ambient temperatures of about 65° to about 80° F. (18°–27° C.) with an aqueous acidic solution having a pH of from about 3.0 to about 4.5 and maintained in contact with the solution for a period of at least about 2 hours, preferably from about 16 to about 72 hours. The alumina may be contacted with an amount of the aqueous acidic solution sufficient to provide between about 5 to about 50 parts by weight of acid per part by weight of alumina. The leached alumina is then separated from the acidic solution and washed with the acidic solution and then with water. Completion of the washing can be conveniently determined by measuring the pH of the wash water after it has contacted the leached alumina. Ordinarily the washing is complete when the wash water pH is above 4.5 or slightly higher. The alumina is then dried at about 200° to about 350° F. (93°–177° C.). The dried alumina generally has a water pore volume of at least about 0.4 cubic centimeters per gram and a surface area of about 160 square meters per gram.

An admixture of alumina or other aluminum compound, and lanthana or other lanthanum compound, is formed and calcined. For example, alumina may be impregnated with a solution of a thermally decomposable lanthanum compound and the impregnated alumina dried to remove the solvent and deposit the lanthanum compound on the alumina. Compounds of other rare earth metals, such as praseodymium and neodymium, and their mixture with lanthanum compounds may be used to form admixtures of one or more rare earth metal oxides and alumina on calcination. However, such admixtures generally are more susceptible to the phase transformation to alpha-alumina that occurs at high temperatures than lanthana-alumina admixtures.

The usual thermally decomposable lanthanum compound is a commercially available water soluble salt, of which the nitrate and acetate are preferred. The impregnation is carried out, for example, by mixing an aqueous solution of the lanthanum compound with finely divided alumina in activated form. Generally, the impregnation is carried out to incipient wetness.

The impregnation solution contains sufficient amounts of the lanthanum compound to provide the desired amount of lanthana in the admixture. The amount of lanthan employed for stabilization depends upon the degree of stability desired. As lanthana is a very efficient inhibitor of the transition to alpha-alumina, excessive concentrations of lanthana of the order of 10 weight percent are not cost effective. If an excessive proportion of alumina is present, it may not be stabilized sufficiently and will lose surface area in the transition to the alpha form.

Generally, the admixture of alumina and lanthana comprises about 75–99 weight percent alumina, expressed as $Al_2O_3$, and about 1–25 weight percent lanthana, expressed as $La_2O_3$. The preferred amounts of lanthana are about 2 to about 10 weight percent to provide optimum stabilization against thermal damage and optimum catalyst performance.

The admixture may be dried at a temperature of from about 200° to about 400° F. (93°–205° C.) for about 2 to about 20 hours. The admixture is then calcined at a temperature of at least about 1800° F. (983° C.), preferably from about 1800° to about 2400° F. (983°–1317° C.) for about 1 to about 24 hours. Preferably, the calcination is conducted in air or other oxidizing atmosphere. The temperature and time of the calcination are such as to provide an alumina/lanthana admixture having a relatively high surface area of at least about 25 square meters per gram, and preferably at least about 40 square meters per gram.

Calcination results in formation of the metal oxides, if the oxide forms are not used as the starting materials, and stabilizes the alumina. The admixture is calcined before any further steps in the method are performed. It is believed that the calcination at the high temperatures employed allows the lanthana to enter the alumina lattice and thus substantially reduce subsequent transition to alpha-alumina.

Generally, the lanthanum compound is admixed in intimate association with the aluminum compound during the calcination. The calcination is preferably conducted before deposition on a substrate while the admixture is free flowing to reduce costs and to enhance the contact between the components and the resulting stabilization effect. Calcination before deposition on a substrate enhances adhesion to the substrate and substantially reduces the possibility of reactions with the substrate. Reactions between the alumina and the substrate promote the formation of inactive forms of alumina and reaction of the lanthana with the substrate reduces the amount of lanthana available for stabilization. Further, less heat and a smaller furnace are required to calcine the admixture before it is placed on a substrate.

In order to enhance the oxidation performance of the catalyst composition, ceria or another cerium compound is deposited on the calcined admixture of the lanthana and the alumina prior to the deposition of the platinum group metal component and the resulting composite is calcined. The ceria enhances the dispersion and stability of the platinum group metal in the catalyst composition. As with the lanthanum impregnation, it is preferred to incorporate the cerium component in intimate association with finely divided lanthana-alumina by impregnating the admixture with a solution of a cerium compound and calcining the resulting free-flowing composite before it is coated on a substrate. An aqueous solution of cerium nitrate, chloride, acetate or any other suitable water-soluble salt that will decompose to the oxide on calcination may be employed. The lanthana-alumina may be impregnated to incipient wetness with a solution containing sufficient cerium salt to provide a ceria/lanthana/alumina calcined composite that contains from about 1 to about 25 percent, and preferably from about 3 to about 10 percent, by weight of cerium oxide expressed as $CeO_2$.

The composite may be dried at a temperature of from about 200° to about 400° F. (93°–205° C.) for about 2 to about 20 hours. The time and temperature of calcination are selected to avoid undue sintering and to provide a lanthana/ceria/alumina composite having a surface area of at least about 25 square meters per gram. Suitable conditions include a calcination in air at a temperature of at least about 1800° F. (983° C.), preferably from about 1800° to about 2400° F. (983°–1317° C.) for about 1 to about 24 hours. The calcination before the deposition of the platinum group metal component prevents its occlusion by sintering.

After the cerium-impregnated lanthana-alumina is dried and calcined, a platinum group metal component is deposited on the composite to promote the activity of the catalyst composition. The platinum group metal component may be platinum, palladium, rhodium, ruthenium, iridium, osmium, and mixtures thereof. When the platinum group metal contains more than one of such components, the component may be composed of a major amount of platinum and a minor amount of one or more of the other platinum group metals such as iridium. The mixture may comprise from about 1 to about 10 weight percent iridium and from about 90 to about 99 weight percent platinum and preferably about 5 weight percent iridium and about 95 weight percent platinum.

Various compounds, complexes, or elemental dispersions of any of the platinum group metals in aqueous or organic mediums may be used to achieve deposition of the platinum group metal component on the composite. A suitable liquid medium will not react with the platinum group metal component and is removable on drying which can be accomplished as part of the preparation or in use of the catalyst. Water soluble platinum group metal compounds or complexes may conveniently be used. Suitable platinum group metal compounds include chloroplatinic acid, potassium platinum chloride, ammonium platinum thiocyanate, platinum tetrammine hydroxide, platinum group metal chlorides, oxides, sulfides, nitrites and nitrates, platinum tetrammine chloride, palladium tetrammine chloride, sodium palladium chloride, hexamine rhodium chloride, and hexamine iridium chloride.

In a preferred embodiment of this invention, the impregnation solution contains an ammonium sulfito complex of platinum group metal prepared according to the methods described in U.S. Pat. No. 3,932,309 to Graham et al. The use of these complexes provides excellent dispersion of the platinum group metal. Preferably, iridium is incorporated in the catalyst by impregnation with an iridium ammonium sulfito complex prepared by reacting iridium chloride with concentrated ammonium bisulfite solution. For example, a solution of the iridium complex may be prepared by combining, at temperatures of 203° F. (95° C.) 10 milliliters of a 10 weight percent iridium chloride solution and 20 milliliters of a 40 weight percent ammonium bisulfite solution. The complex is formed in a period of 10 minutes after combination. In order to provide the desired levels of platinum group metal in the catalyst compositions, multiple impregnations to incipient wetness with intermediate drying may be conducted.

After the impregnations are completed, the composition may be dried, for example, at a temperature of from about 200° to about 400° F. (93°–205° C.) for about 2 to about 20 hours. The composition may be calcined under conditions which provide a composition having characteristics that promote the desired reaction. Deposition of the platinum group metal component on a free-flowing composite and calcination of the free-flowing composition induce maximum dispersion of the platinum group metal. This calcination stabilizes the catalyst composition so that, during the initial stages of use, its activity is not materially altered. The temperature of this calcination is low enough to prevent substantial sintering of the composite which would cause substantial occlusion of the platinum group metal component. Thus, the calcination may be conducted in air at temperatures of from about 500° to about 1400° F. (260°–761° C.), preferably from about 800° to about 1200° F. (427°–649° C.) for about 1 to about 4 hours.

In the catalyst of this invention, the platinum group metals are promoters for oxidation, reduction and decomposition reactions and are present in amounts sufficient to provide catalytic compositions having significant activity for catalyzing these reactions. Generally, the amount of platinum group metal used is a minor portion of the catalyst composite and typically does not exceed about 10 weight percent of the calcined composite. The amount may be about 0.05 to 10 percent and is preferably about 0.2 to 6 percent based on the weight of the calcined composite to maintain good activity with prolonged use.

The catalyst composition of this invention generally has a surface area of at least about 25 square meters per gram and is suitable for deposition on a substrate or for use without such deposition in either finely divided form or macrosize forms prepared by pelleting, extruding, and the like. Preferably, the catalyst compositions are deposited on a rigid substrate capable of maintaining its shape and strength at high temperatures, for example up to about 3200° F. (1761° C.). The substrate typically is relatively catalytically inert and has a low thermal coefficient of expansion, good thermal shock resistance, and low thermal conductivity. Preferably, the structure has considerable excessible porosity, such as a water pore volume of at least about 10%. The substrate may be metallic or ceramic in nature or a combination thereof. Preferred substrate materials include refractory metal oxides such as alpha-alumina, aluminosilicates, zircon, magnesium silicate, cordierite, cordierite/alpha-alumina, silicon nitrite, silicon carbide, zircon-mullite, spodumene, alumina-silica-magnesia, and zirconium silicate. The preferred substrates for certain high temperature reactions are honeycombs and have a monolithic, skeletal structure having gas flow channels extending therethrough.

In preparing substrates coated with the catalyst compositions of this invention, an aqueous slurry or slip of the essentially water insoluble catalyst composition is contacted with the substrate as by dipping the substrate into the slip. The solid content of the slurry forms an adherent deposit on the substrate on drying. For example, using any suitable grinding means, such as acid ball milling, the composition is reduced to a particle size of about 1 to about 10 microns and homogenized with acid to form the slip. The coated substrate is then dried at a temperature of from about 200° to about 400° F. (95°–205° C.) for about 1 to about 4 hours to remove the solvent and deposit the solids in an adherent film on the substrate. After drying, the coating has a surface area of at least about 25 square meters per gram. The dried monolith may be calcined at from about 500° to about 1400° F. (260°–761° C.) for about 1 to about 4 hours.

The amount of the composition that is coated on the substrate depends on economics, size limitations, and design characteristics. Generally, the composition comprises about 5 to about 20 weight percent based upon the weight of the substrate.

Monolithic catalytic compositions prepared in accordance with this invention are particularly useful when employed in the high temperature combustion of carbonaceous fuels. Flammable mixtures of most fuels are normally constituted to burn at relatively high temperatures, i.e., about 3300° F. (1817° C.) and above, at which substantial amounts of nitrogen oxides are formed. However, there is little or no formation of nitrogen oxides in a system which burns the fuel catalytically at lower temperatures.

The catalyst composition of this invention may be used for the combustion of carbonaceous fuel by contacting a fuel/air admixture with the composition on the monolithic substrate at a temperature sufficient to combust the admixture. The proportions of fuel and air in the admixture charged to the combustion zone are typically such that there is a stoichiometric excess of oxygen based on the complete conversion of the fuel to carbon dioxide and water.

Suitable gaseous or liquid fuels include, for example, low molecular weight aliphatic hydrocarbons, aromatic hydrocarbons, middle distillate fuels, hydrotreated heavier fuels, alcohols, ethers, aromatic ethers, and carbon monoxide.

The fuel-air mixture is generally passed to the catalyst in the combustion zone at a linear gas velocity of above about 3 feet per second, but considerably higher velocities may be required depending upon such factors as temperature, pressure, and fuel composition.

The catalyst composition generally operates at temperatures from about 1700° to about 3200° F. (927°–1761° C.), preferably about 2000° to about 3000° F. (1094°–1650° C.). The temperature of the catalyst zone is controlled by controlling the fuel-air ratio. The total residence time in the combustion system should be sufficient to provide essentially complete combustion of the fuel, but not so long as to result in the formation of nitrogen oxides.

The catalyst of this invention can also be used to promote the oxidation of hydrocarbons, oxygen-containing organic compounds such as aldehydes and organic acids, carbon monoxide, and other products of incomplete combustion. The catalysts of the present invention are especially useful in the conversion of carbon monoxide and partially combusted hydrocarbons that are present in the exhaust gases from the combustion of carbonaceous fuels.

The following example illustrates the preparation and use of some representative catalytic composites and compositions of this invention. All percentages in the examples are by weight unless otherwise indicated.

EXAMPLE 1

An activated alumina powder was prepared by spray drying an alpha-alumina monohydrate and calcining at 538° C. for 1 hour. The powder was washed with an acetic acid solution having a pH of 3.9, aged for 3 days, and then filtered. The filter cake was again washed with the acetic acid solution and finally with deionized water and then dried at 320° F. (160° C.) for 16 hours. The resulting alumina powder had a surface area of 160 square meters per gram and a water pore volume of 1.2 cubic centimeters per gram.

129.84 Grams of a lanthanum nitrate solution having an $La_2O_3$ titer of 0.2458 grams per gram of solution were diluted to 600 milliliters with water. Three 500 grams batches of the alumina were impregnated to a level of 6% $La_2O_3$ by applying a stream of the lanthanum nitrate solution to the activated alumina powder with constant agitation. The impregnated alumina was dried for 16 hours at 320° F. (160° C.) and calcined for one hour at a bed temperature that ranged from 2250° to 2286° F. (1233°–1253° C.). The calcined lanthana-alumina had a surface area of 44 square meters per gram and a water pore volume of 1.1 cubic centimeters per gram.

403.18 grams of a cerium nitrate solution having a $CeO_2$ titer of 0.2996 grams per gram of solution were diluted to 753 milliliters and the resulting solution impregnated onto 685 gram batches of the lanthana-stabilized alumina. The impregnated material was dried at 320° F. (160° C.) for 16 hours and calcined for 1 hour at a bed temperature that ranged from 2151° to 2196° F. (1178°–1203° C.). The resulting product had a surface area of 25 square meters per gram and a water pore volume of 0.95 cubic centimeters per gram.

In accordance with the method described in U.S. Pat. No. 3,932,309 to Graham et al., an ammonium platinum sulfito complex containing 31.64% platinum was prepared by reacting chloroplatinic acid and ammonium bisulfite and dissolved in 850 milliliters of water. A solution containing an ammonium iridium sulfito complex was prepared by reacting 1.0045 grams of iridium chloride containing 52.4% iridium with 17.5 milliliters of concentrated ammonium bisulfite solution. The resulting solution was added to the solution of ammonium platinum sulfito complex to form an impregnation solution. The volume of the impregnation solution was increased to 952 milliliters. The solution was impregnated on 1000 grams of the composite in five successive steps with drying at 320° F. (160° C.) for 4 hours between each impregnation. After the five impregnations were completed, the catalyst powder was activated at 1000° F. (538° C.) for 1 hour. The resulting catalyst composition contained 5% platinum group metal consisting of 95% platinum and 5% iridium.

1057 grams of the catalyst composition were mixed with 1460 grams of water and ball milled for 20 hours. 6 milliliters of concentrated nitric acid were then added to the mill and milling continued for 1 hour. The slip was then poured from the ball mill and the pH adjusted from 3.5 to 2.8 with concentrated nitric acid. The solids content was adjusted to 36 weight percent with water. 11 Torvex ® monoliths commercially available from E. I. duPont deNemours & Company having small, medium, and large cell sizes of about 65, 34, and 19 parallel gas passages per square inch of cross sectional area respectively, were dipped into the slip, drained, blown with air, dried at 230° F. (110° C.) for 2.5 hours, and calcined at 932° F. (500° C.) for 2 hours. Based upon the total weight, the average coating level and the platinum group metal content were 13.8% and 0.76%, 18.3% and 0.99%, and 10.8% and 0.60% for the small, medium, and large cell size monoliths respectively.

The monolithic catalysts were tested at atmospheric pressure with natural gas as the fuel. Nine in depth thermocouples were connected to three monoliths and the monoliths joined together prior to the testing. Bed temperatures in excess of 2700° F. (1483° C.) for extended periods were achieved. Measurements of carbon monoxide and nitrogen oxide emission levels are summarized in Table I.

TABLE I

| Run No. | Test Time, hrs. | Fuel Rate Kg./hr. | CO, ppm | $NO_1$ ppm | Approximate Bed Temperature | |
|---|---|---|---|---|---|---|
| 1 | 2.0 | 1.9 | 0 | 0 | 2400° F. | (1317° C.) |
| 2 | 18.2 | 2.1 | 0 | 4 | 2700° F. | (1483° C.) |
| 3 | 19.6 | 5.3 | 0 | 4 | " | " |

TABLE I-continued

| Run No. | Test Time, hrs. | Fuel Rate Kg./hr. | CO, ppm | NO,[1] ppm | Approximate Bed Temperature |
|---|---|---|---|---|---|
| 4 | 20.0 | 2.2 | 0 | 2 | 2400° F. (1317° C.) |

[1] All $NO_x$ measured was present as NO.

Essentially no increase in either CO or $NO_x$ emissions was noted over the entire testing time at the nominal 2400° F. (1317° C.) bed temperature. Slight increases in $NO_x$ production occurred at the 2700° F. (1483° C.) bed temperatures. Increased throughput did not affect carbon monoxide and nitrogen oxide emissions.

What is claimed is:

1. A catalyst composition comprising (a) a composite of from about 1 to about 25 weight percent ceria, from about 1 to about 10 weight percent lanthana, and from about 65 to about 98 weight percent alumina, said composite prepared by depositing a solution of a cerium compound on a calcined admixture of a lanthanum compound and an aluminum compound and calcining the composite; and (b) a catalytically-effective amount of one or more platinum group metals deposited on the calcined composite.

2. The catalyst composition of claim 1 in which the composite contains from about 3 to about 10 weight percent ceria.

3. The catalyst composition of claim 1 in which the calcined admixture has a surface area of at least about 25 square meters per gram.

4. The catalyst composition of claim 1 in which the calcined composite has a surface area of at least about 25 square meters per gram.

5. The catalyst composition of claim 1 further comprising a substrate on which the one or more platinum group metals deposited on the calcined composite are coated.

6. The catalyst composition of claim 5 in which the substrate is a honeycomb.

7. The catalyst composition of claim 5 in which the substrate is in particulate form.

8. The catalyst composition of claim 1 in which the composite is calcined at a temperature of at least about 1800° F.

9. The catalyst composition of claim 8 in which the composite is calcined at a temperature of about 1800° to about 2400° F.

10. The catalyst composition of claim 1 in which the one or more platinum group metals are deposited on the calcined composite in an amount from about 0.05 to about 10 percent by weight of said composite.

11. The catalyst composition of claim 1 in which the one or more platinum group metals are deposited on the calcined composite in an amount of from about 0.2 to about 6 percent by weight of said composite.

12. The catalyst composition of claim 1 in which the platinum group metals are a mixture of platinum metal and iridium metal.

13. A method of preparing a catalyst composition comprising (1) forming an admixture of an aluminum compound and a lanthanum compound; (2) calcining the admixture at a temperature of at least about 1800° F.; (3) depositing a solution of a cerium compound on the calcined admixture to form a composite; (4) calcining the composite at a temperature of at least about 1800° F.; (5) depositing a catalytically-effective amount of one or more platinum group metals, compounds, or complexes on the calcined composite; and (6) calcining the resulting composition at a temperature of from about 500° to about 1400° F.

14. The method of claim 13 in which the aluminum compound is activated alumina.

15. The method of claim 14 further comprising leaching the activated alumina with an aqueous acidic solution before step (1).

16. The method of claim 13 in which the admixture is calcined at a temperature from about 1800° to about 2400° F.

17. The method of claim 13 in which the composite is calcined at a temperature from about 1800° to about 2400° F.

18. The method of claim 13 further comprising depositing the composition on a substrate.

19. The method of claim 18 in which the substrate is a honeycomb.

20. The method of claim 18 in which the substrate is in particulate form.

21. The method of claim 13 in which the one or more platinum group metals are deposited on the calcined composite in an amount from about 0.05 to about 10 percent by weight of said composite.

22. The method of claim 13 in which the one or more platinum group metals are deposited on the calcined composite in an amount of from about 0.2 to about 6 percent by weight of said composite.

23. The method of claim 13 in which the platinum group metals are a mixture of platinum metal and iridium metal.

24. The method of claim 13 in which the cerium compound is deposited on the calcined admixture of the lanthana and the alumina in an amount sufficient to form a calcined composite of from about 1 to about 25 weight percent ceria, from about 1 to about 10 weight percent lanthana, and from about 65 to about 98 weight percent alumina.

25. The method of claim 13 in which the one or more platinum group metals are deposited on the calcined composite as an ammonium sulfito complex or complexes.

26. A catalyst composition for the combustion of carbonaceous fuel comprising (a) a composite of from about 1 to about 25 weight percent ceria, from about 1 to about 10 weight percent lanthana, and from about 65 to about 98 weight percent alumina, said composite having a surface area of at least about 25 square meters per gram and prepared by impregnating finely divided, acid-leached, activated alumina with an aqueous solution of a thermally decomposable lanthanum salt, calcining the resulting admixture at a temperature of from about 1800° to about 2400° F., impregnating the calcined admixture with an aqueous solution of a thermally decomposable cerium salt, and calcining the resulting composite at a temperature of from about 1800° to about 2400° F.; (b) a catalytically-effective amount of one or more platinum group metals deposited on the calcined composite; and (c) a honeycomb substrate on which the one or more platinum group metals deposited on the calcined composite are coated.

27. The catalyst composition of claim 26 in which the platinum group metals are a mixture of platinum metal and iridium metal.

28. The method of claim 18 further comprising calcining the composition deposited on the substrate at a temperature of from about 500° to about 1400° F.

* * * * *